(12) United States Patent
Marcelli

(10) Patent No.: US 7,231,203 B2
(45) Date of Patent: Jun. 12, 2007

(54) METHOD AND SOFTWARE PROGRAM PRODUCT FOR MUTUAL AUTHENTICATION IN A COMMUNICATIONS NETWORK

(75) Inventor: Maurizio Marcelli, Rome (IT)

(73) Assignee: Tim Italia S.p.A., Milan (IT)

( * ) Notice: Subject to any disclaimer, the term of this patent is extended or adjusted under 35 U.S.C. 154(b) by 32 days.

(21) Appl. No.: 10/548,221

(22) PCT Filed: Mar. 5, 2004

(86) PCT No.: PCT/EP2004/002307

§ 371 (c)(1),
(2), (4) Date: Sep. 2, 2005

(87) PCT Pub. No.: WO2004/079985

PCT Pub. Date: Sep. 16, 2004

(65) Prior Publication Data

US 2006/0189298 A1   Aug. 24, 2006

(30) Foreign Application Priority Data

Mar. 6, 2003   (IT) .......................... RM2003A0100

(51) Int. Cl.
*H04M 1/66* (2006.01)
(52) U.S. Cl. ...................... 455/411; 455/433; 455/410; 455/435
(58) Field of Classification Search ................ 455/411, 455/433, 410, 435; 380/247, 211
See application file for complete search history.

(56) References Cited

U.S. PATENT DOCUMENTS 5,689,563 A * 11/1997 Brown et al. ............... 380/247

6,618,584 B1 * 9/2003 Carneheim et al. ......... 455/411

(Continued)

FOREIGN PATENT DOCUMENTS

WO   WO 00/02406   1/2000

(Continued)

OTHER PUBLICATIONS

3GPP SA: "Universal Mobile Telecommunications Systems (UMTS)", 3G Security, Security Architecture, 3GPP TS 33.102 Version 5.1.0 Release 5, European Telecommunications Standards Institute, pp. 1-62, (2002).

(Continued)

*Primary Examiner*—Joseph Feild
*Assistant Examiner*—David Q. Nguyen
(74) *Attorney, Agent, or Firm*—Finnegan, Henderson, Farabow, Garrett & Dunner, L.L.P.

(57) ABSTRACT

A method for mutual authentication between a subscriber and a communications network, in which a random number is generated at the subscriber's terminal. The random number is sent to the authentication sub-system managing the authentication of the subscriber for the access to the network, e.g., together with a subscriber's identifier. At the authentication sub-system, the identifier is used for checking the credentials of the subscriber. During the authentication process, parameters related to the subscriber's identifier are generated at the authentication sub-system, and the random number is encrypted using a session key formed using such parameters. The encrypted random number is then sent back to the subscriber's terminal, together with information needed to terminal in order to reconstruct the session key. After having reconstructed the session key, the subscriber's terminal decrypts the random number and checks matching with its generated random number. The matching between the two numbers allows the verification, by the subscriber, that the access point to which he/she is connecting is not a fake access point.

27 Claims, 2 Drawing Sheets

U.S. PATENT DOCUMENTS

2002/0012433 A1*  1/2002  Haverinen et al. .......... 380/247
2003/0166398 A1*  9/2003  Netanel ...................... 455/410
2006/0052085 A1*  3/2006  Rodriguez et al. .......... 455/411

FOREIGN PATENT DOCUMENTS

WO    WO 02/052784    7/2002

OTHER PUBLICATIONS

Alperovich et al., "EAP SIM GMM Authentication draft-buckley-pppext-eap-sim-gmm-00.txt", PPPEXT Working Group Internet Draft, pp. 1-30, (2002).

Haverinen et al., "EAP SIM Authentication draft-haverinen-pppext-eap-sim-10.txt", Point-to-Point Extensions Working Group Internet Draft, pp. 1-59, (2003).

* cited by examiner

METHOD AND SOFTWARE PROGRAM PRODUCT FOR MUTUAL AUTHENTICATION IN A COMMUNICATIONS NETWORK

CROSS REFERENCE TO RELATED APPLICATIONS

This application is a national phase application based on PCT/EP2004/002307, filed Mar. 5, 2004, and claims the priority of Italian application no. RM2003A000100, filed Mar. 6, 2003, the content of both of which is incorporated herein by reference.

BACKGROUND OF THE INVENTION

1. Field of the Invention

The present invention relates to a method for authentication in a communications network, especially a packet, e.g. IP (Internet Protocol), network.

2. Description of the Related Art

The strong growth in number of Internet users has been one of the most remarkable phenomena in communications in recent years. The Internet has born and has developed as an "open network", being adapted to share information between users. Applications, such as the e-mail, the browsing of web pages, the download of files, based on Internet communications protocols such as the SMTP (Simple Mail Transfer Protocol), the FTP (File Transfer Protocol) or the HTTP (Hyper Text Transfer Protocol) are now of common knowledge and used by a continuously growing number of users. The Internet technology is being used also in contexts not open to the public, such as within corporate local area networks, for sharing information between employees, in a so-called Intranet environment. Recently, the W-LAN (Wireless Local Area Networks) technology is also born and is being developed, allowing Internet or Intranet users to connect to the network without the need of a cable, by exploiting wireless network terminal adapters and access points.

In order to connect to the network, a well known technique provides that the user gives its credentials in the form of a user-ID and a related password to an authentication server, possibly belonging to a service provider. For example, RADIUS (Remote Authentication Dial-In User Service) is a known server for remote user authentication based on a user-ID/password scheme.

Another proposed method for authentication to be performed for accessing a network, especially an IP network, is disclosed in the PCT patent application no. 00/02406, in the name of Nokia Networks OY. To allow authentication of users of IP networks in a geographically large area, the IP network's terminal uses a subscriber identity module (SIM) as used in a separate mobile communications system, whereby a response may be determined from a challenge given to the identity module as input. The IP network includes a special security server to which a message about a new user is transmitted when a subscriber attaches to the IP network. The subscriber's authentication information containing at least a challenge and a response is fetched from the said mobile communications system to the IP network and authentication is carried out based on the authentication information obtained from said mobile communications system by transmitting the said challenge through the IP network to the terminal, by generating a response from the challenge in the terminal's identity module and by comparing the response with the response received from the mobile communications system. Practically, as disclosed in the same PCT patent application, the authentication method of an existing mobile communications network, especially a GSM (Global System for Mobile communications) network, is used in an IP network.

Without entering in specific details, a typical authentication procedure used in a mobile communication network, such as a GSM network, provides that when a mobile terminal requires to join the mobile network it first sends the IMSI (International Mobile Subscriber Identifier), stored on the SIM associated to the mobile terminal, to the network. An Authentication Center (AuC) receives the IMSI number and generates a random number RAND that is inputted to an algorithm dedicated to the authentication (the so-called A3 algorithm). The algorithm is parameterized with an encryption key $k_i$ uniquely associated to the IMSI number and, applied to the random number RAND, gives as a result a so-called Signed Response SRES1. The random number RAND is also sent to the mobile terminal, specifically to the SIM associated to the mobile terminal, in order to challenge thereof the generation of a Signed Response SRES2, which is rendered possible from the fact that the SIM stores the same encryption key $k_i$ and algorithm A3. SRES2 is then sent to the AuC, that checks a matching between SRES1 and SRES2 in order to grant access in the mobile network to the mobile terminal. If the matching between SRES1 and SRES2 is not verified, the access to the mobile network is denied.

The use of the above mentioned authentication procedure for connection to a communications network different from a mobile network, such as the Internet or a corporate Intranet, improves security with respect to a procedure only requiring the provision of a user-ID and a password. For example, a service provider can be substantially assured that the credentials given from the user requiring the connection are genuine, i.e. that the user is truly one of its subscribers.

However, the Applicant observes that the use of the above mentioned authentication procedure does not guarantee the user in the same way with respect to the service provider, i.e. it does not guarantee the user that he/she is not giving his/her confidential data to a "fake" network, through a fake access point, provided by a malicious entity pretending to be the user's service provider. In particular, the Applicant observes that since the match between the Signed Response SRES1 generated at the AuC and the Signed Response SRES2 generated at the user's SIM is only made at the network side, the user has no way to verify that he/she is actually accessing its trusted network.

The Applicant further observes that such problem is of particular importance accessing networks by exploiting W-LAN technology, in that W-LAN fake access points are relatively easy to be implemented.

The Applicant has faced the problem of implementing an authentication method, particularly adapted for accessing a communications network, more particularly a packet-based (e.g. IP) network, in which a mutual identification can be guaranteed between a subscriber and a service provider in both directions.

SUMMARY OF THE INVENTION

The Applicant has found that such problem can be solved by an authentication method in which a random number is generated at the subscriber's terminal. The random number is sent to the authentication sub-system managing the authentication of the subscriber for the access to the network, e.g. together with a subscriber's identifier. At the authentication sub-system, the identifier is used for checking the credentials of the subscriber. During the authentication process, parameters related to the subscriber's identifier are generated at the authentication sub-system, and the random number is encrypted using a session key formed using such parameters. The encrypted random number is then sent back to the subscriber's terminal, together with information needed to terminal in order to reconstruct the session key. After having reconstructed the session key, the subscriber's terminal decrypts the random number and checks matching with its generated random number. The matching between the two numbers allows the verification, by the subscriber, that the access point to which he/she is connecting is not a fake access point.

In a first aspect, the invention relates to a mutual authentication method between a user and a communications network as disclosed in claim 1. Preferred versions of the method of the first aspect are disclosed in claims 2 to 13.

In a second aspect, the invention relates to a method for allowing a user to verify a trust of a communications network as disclosed in claim 14. Preferred versions of the method of the second aspect are disclosed in claims 15 to 22.

In a third aspect, the invention relates to a software program as disclosed in claim 23.

In a fourth aspect, the invention relates to a software program product as disclosed in claim 24.

In a fifth aspect, the invention relates to an authentication kit as disclosed in claim 25. A preferred embodiment of the authentication kit of the fifth aspect is disclosed in claim 26.

In a sixth aspect, the invention relates to a method for allowing a user to verify a trust of a communications network as disclosed in claim 27.

BRIEF DESCRIPTION OF THE DRAWINGS

The features and advantages of the invention will be made apparent by the following detailed description of some embodiments thereof, provided merely by way of non-limitative examples, description that will be conducted making reference to the attached drawings, wherein.

DETAILED DESCRIPTION OF THE INVENTION

Figure 1:
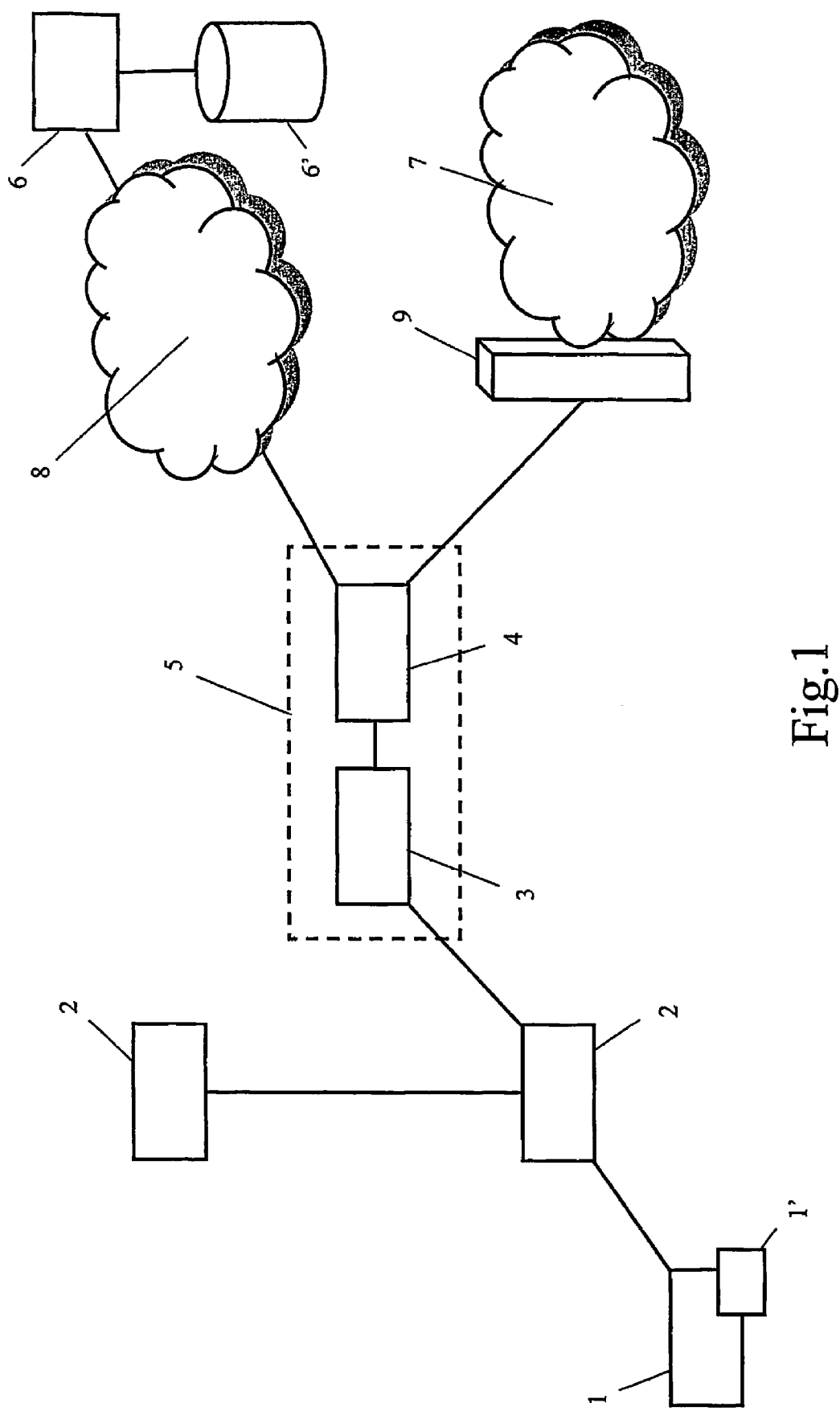
FIG. 1 shows a schematic embodiment of a communications network architecture used in the present invention.

FIG. 1 shows a schematic embodiment of a communications network architecture, in which a remote user connects to an access point 2 in order to gain access to an IP network 7, for example the Internet. Different access points 2 may be provided by a service provider to allow network access to different remote users located in different geographical points.

The remote user has a terminal 1, such as a personal computer, for example a portable computer, which carries suitable client software (e.g. a software program based on RADIUS) and hardware adapted to connect to the network 7 through the access point 2. To this purpose, the computer 1 is for example associated to a modem (e.g., an ISDN modem) and exploits a dial-up connection, or an xDSL modem and exploits an xDSL connection, or a GPRS modem and exploits a wireless connection, or a Wireless LAN (WLAN) terminal adapter and exploits a W-LAN connection (such as a WI-FI—WIreless-FIdelity—connection, a kind of Internet access that is becoming popular in areas such as hotels and airports), to the access point 2.

In order to gain access to the network 7, the user is authenticated by the service provider. For authentication purposes, the remote user is provided with a subscriber identity module 1', particularly (albeit not limitedly) a Subscriber Identity Modules (SIM) of the type used for authentication purposes in Digital Cellular phone Systems (DCSs) or Public Land Mobile Networks (PLMNs), such as the widespread Global System for Mobile communications (GSM) mobile phone networks, or known extensions thereof such as the General Packet Radio Service (GPRS) networks (which actually is a sub-network of the GSM network), or Universal Mobile Telecommunications System (UMTS) networks (a wide-band third-generation cellular communication system), or a satellite-based mobile communication network.

As known in the art, a SIM normally takes the form of a card (credit-card size or smaller, depending on the user terminal miniaturization scale); with embedded integrated circuit components, particularly storing personalized data that support SIM's authentication, as well as encryption and decryption. At least up to now, the use of a SIM (and of the SIM-based authentication procedure) for identifying a mobile communication terminal coupled thereto has proven to be a robust way to make it impossible for other devices to impersonate that terminal, thus providing secure authenticated access to, e.g., an account corresponding to that particular user.

The user's SIM 1' is operatively, and preferably removably, coupled to the remote user computer 1; for example, the SIM 1' is embedded in a computer peripheral device that can be operatively coupled to, so as to be functionally accessible by, the computer 1, for example a hardware key connectable to a port (not explicitly shown in FIG. 1) of the computer 1, e.g. a Universal Serial Bus (USB) port; alternatively, the SIM 1 may be operatively coupled to the computer 1 through a PCMCIA port thereof, or by means of a peripheral of the smart-card reader type adapted to interact with a SIM and to be coupled to, e.g., a serial port of the computer 1, or the SIM 1' may be embedded in a memory card that can then be operatively coupled to the computer 1 by means of a memory card reader. It is pointed out that the specific way in which the SIM 1' is operatively coupled to the computer 1 is not limitative to the present invention, being in general sufficient that the SIM 1' is operatively coupled to the computer 1 (in a way suitable for enabling communication between the computer 1 and the SIM 1') by means of any type of adapter/reader device connected to the computer 1 through any type of peripheral port. The software client adapted to connect to the network 7, located on the user's personal computer 1, is also adapted to communicate with the SIM 1' coupled to the personal computer 1.

The access point 2 is associated to an access node 5 that may comprise a network access server (NAS) 3 and a gateway 4. The access node 5 is operatively connected to an authentication server 6, possibly part, as shown in FIG. 1, of the mobile network 8 of a mobile operator. The access node 5 is also connected to the network 7 to which the remote user is requiring access, possibly through a proxy server 9, e.g. a firewall, in particular if the network 7 is a private network such as a corporate Intranet.

With reference to the access node 5, it has to be understood that even if FIG. 1 shows a NAS 3 and a gateway 4 as separate functional entities within the access node 5, in practice they may correspond to suitable software products residing on the same hardware equipment. The NAS 3 may be a router adapted to route traffic directed to and coming from the access points 2. The gateway 4 may be adapted to select where the traffic coming from the access points 2 has to be directed: in particular, during the authentication procedure requested by a remote user connected to an access node 2 the traffic coming from the access node 2 is directed towards the authentication server 6 (and vice versa), whereas once the authentication of the remote user has been verified the traffic coming from the access node is directed towards the network 7 (and vice versa).

The authentication server 6 is adapted to receive identification information of the remote user, in order to verify that the remote user is a trusted subscriber of the network access service. Furthermore, the authentication server 6 is also adapted to provide the remote user with information suitable for allowing verification, by the remote user, of the fact that the network to which he/she is connecting is not a fake network, provided by an entity pretending to be his/her service provider. Thus, the whole authentication procedure, that will be explained in detail in the following, allows a mutual authentication between the remote user and the service provider. In preferred embodiments the authentication server 6 is located in the premises of a mobile network operator and is adapted to communicate with the Home Location Register (HLR) 6' of the mobile network operator, in order to exploit, for the authentication of the remote user, an authentication procedure based on the well-known authentication procedure followed by mobile terminals requesting access to the mobile network. In particular, the HLR 6' of the mobile network operator includes a database in which an identifier and a key uniquely associated to the remote user are stored. Such identifier and key are also stored on the SIM 1' of the remote user. In other words, the authentication server 6 performs functions similar to those of a Visitor Location Register (VLR) included in the network of a mobile network operator in order to grant or deny access to the remote user towards the IP network 7: for this reason, the authentication server 6 will be referred in the following as I-VLR 6. The I-VLR 6 may run standard software, such as RADIUS, for controlling at least some steps of the authentication procedure.

Figure 2:
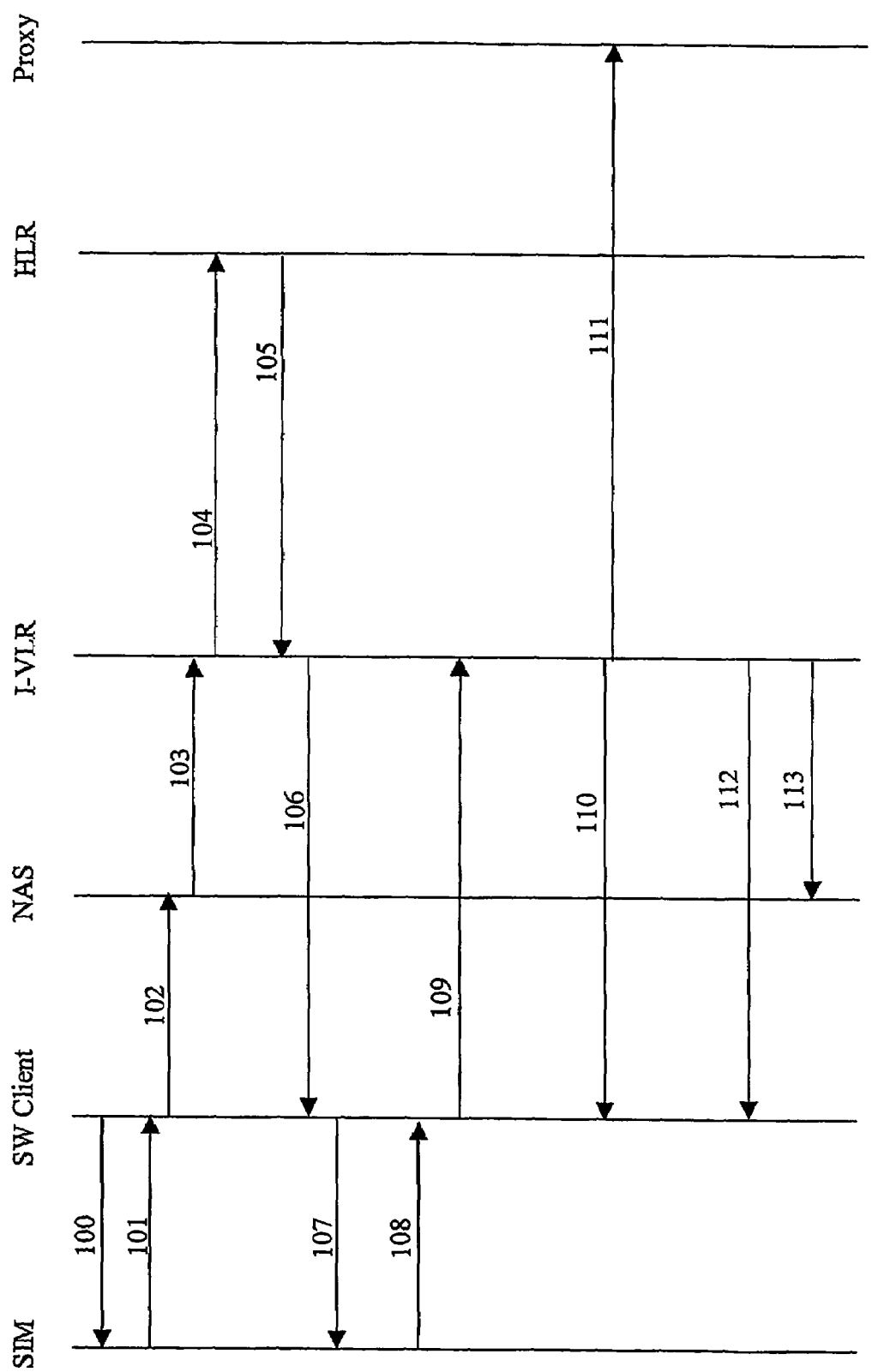
FIG. 2 shows an exemplary exchange of messages taking place between various network elements during the authentication procedure of the invention.

When requesting access to the network 7, the remote user runs the software client dedicated to control the connection to the access point 2. FIG. 2 shows a preferred embodiment of a flux of messages exchanged between the various equipments of the network architecture shown in FIG. 1.

With reference to FIG. 2, the software client communicates with the SIM (100) in order to recover (101) a user's identifier, such as the International Mobile Subscriber Identity (IMSI) or the Temporary Mobile Subscriber Identity (TMSI), stored on the SIM. Furthermore the software client generates a number, preferably a random number Ra, that, as it will be clarified in the following, plays a role in the steps of the authentication procedure required in order to allow the user to authenticate the access point 2 and the network 7 as "trusted". Herein and in the following, the term "number" may be interpreted as any binary, octal, decimal, or hexadecimal number, or even as a generic string of alphanumeric characters.

The software client also controls the connection to the NAS 3, through the access point 2. In a step labeled as 102 in FIG. 2, the software client sends to the NAS 3 the identifier recovered from the SIM and at least a portion of the random number Ra. For example, with specific reference to a connection based on RADIUS, the identifier IMSI and the random number Ra may be concatenated together in the RADIUS Username field, whereas the RADIUS Password field may be filled with any fixed string (e.g. "SIM_Auth_Subs"). In order to increase privacy, the identifier and the random number Ra may be sent in encrypted form. For the purpose of encryption, the user's software client may be comprised of a public key, e.g. a RSA-based key, provided in advance by the service provider, which in turn retains the related private key. In preferred embodiments, the public key has a length of at least 1024 bits. The connection protocol from the remote user's personal computer 1 and the NAS 3 may further comprise the sending of a domain field, for example in order to allow the NAS 3 to identify different types of connection requests, such as for example a dial-up request, a xDSL request or a W-LAN request. Advantageously, a single NAS 3 may manage, in such way, different types of connections coming from various types of access points 2, also in case of a connection request coming from an access point of another service provider. Exemplarily, the domain field may be filled with "@wl" identifying a W-LAN connection or with "@ia", identifying a dial-up connection.

The NAS 3 forwards (as shown by 103 in FIG. 2) the identifier and the random number Ra to the I-VLR 6. The decryption of the identifier and the random number Ra may be performed at the NAS 3 or, preferably, at the I-VLR 6. The I-VLR extracts the user's identifier, e.g. the IMSI, and forwards the same (as shown by 104 in FIG. 2) to the HLR 6'. The HLR 6' (or an Authentication Center, AuC, connected to the HLR 6') comprises a database in which a unique key $k_i$ is associated to the IMSI. The unique key $k_i$ is also stored on the SIM 1' of the remote user. In other words, the unique key $k_i$ represents a shared secret between the SIM 1' and the authentication sub-system of the network, comprising the I-VLR 6 and the HLR 6' (or the AuC). Following a procedure which is typical for authentication of mobile phones in a mobile telephony network, the HLR 6' (or the AuC) generates a random number Rand1, to which a first algorithm, such as the well known A3 algorithm, parameterized with the unique key $k_i$, is applied in order to obtain a Signed Response SRES1. Furthermore, a second algorithm, such as the well known A8 algorithm, parameterized with the unique key $k_i$, is applied to the random number Rand1, in order to obtain a session key $k_{c1}$. In other words, the HLR 6' is adapted to obtain at least one triplet of parameters associated to the remote user's identifier, the triplet of parameters being composed by Rand1, $kc_1$, SRES1. In preferred embodiments, at least a second triplet is required to the HLR 6', the second triplet being generated starting from a further random number Rand2 and applying the same procedure as explained above. The second triplet is composed by the further random number Rand2, and by the related further session key $k_{c2}$ and further Signed Response SRES2. The triplet or triplets is/are then sent (105) from the HLR 6' to the I-VLR 6.

After receiving the triplet or triplets, the I-VLR 6 encrypts the random number Ra using a further algorithm, such as the well known 3DES algorithm, parameterized with an authentication session key generated by using at least the triplet parameters, according to a predetermined rule. More particularly, the authentication session key may be the key $k_{c1}$ or $k_{c2}$, or a concatenation thereof, or a concatenation of the keys $k_{c1}$ and/or $k_{c2}$ and the signed responses SRES1 and/or SRES2. In preferred embodiments at least a portion of the random number Ra received from the software client may be also concatenated together with the triplet parameters in order to generate the authentication session key. The concatenation of different parameters obtained from more than one triplet allows to obtain longer authentication session keys, thus permitting a more secure connection between the I-VLR 6 and the user's personal computer 1, which is of particular importance in case of W-LAN connection. For example, the random number Ra may be encrypted using an authentication session key formed by the concatenation of $k_{c1}$, SRES2, $k_{c2}$ and Ra8, wherein Ra8 are the first 8 digits of the random number Ra. A further random number TID (or a portion thereof), generated by the I-VLR 6, may be also encrypted with the authentication session key together with the random number Ra. Such further random number TID may be a transaction identifier, identifying at the I-VLR 6 the particular connection session initiated by the remote user's personal computer 1. After encryption of the random number Ra, and possibly of the random number TID, the encrypted frame, together with the random numbers Rand1 and Rand2 (the latter in case two triplets were obtained by the HLR 6'), is sent (106) to the personal computer 1, i.e. to the software client controlling the network connection.

The random numbers Rand1 and Rand2, that were obtained by the HLR 6', are then sent to the SIM (107) from the client software, in order to challenge the SIM to produce the related keys $k_{c1}$, $k_{c2}$ and signed responses SRES1, SRES2, using the stored unique key $k_i$.

The SIM then provides (108) the obtained parameters to the software client. Using the parameters obtained by the SIM, the software client may reconstruct the authentication session key, in a manner corresponding to that used by the I-VLR, in order to decrypt the encrypted frame received from the I-VLR 6. The rule according to which the authentication session key is reconstructed by the software client is the same used by the I-VLR. After having reconstructed the authentication session key, the software client can extract the Ra number received from the I-VLR 6 and compare the same with the random number Ra self-generated at the beginning of the procedure. The matching of the two Ra numbers allows verification, by the software client (i.e., by the user), that the connection service through which the personal computer 1 is connecting to the network 7 is trusted. In other words, the user has the possibility to "authenticate" the connection service.

In order to complete the authentication procedure, the software client forwards (109) to the I-VLR 6 at least one of the signed responses SRES1 or SRES2 generated by the SIM, possibly encrypted with the authentication session key. The transaction identifier TID may be also encrypted together with the signed response or responses, and sent to the I-VLR 6. The I-VLR 6 then checks matching between the signed response or responses locally generated and the signed response or responses generated by the SIM 1'.

If the matching among the signed responses is verified, an accept request message is sent (110) to the software client, allowing access to the network 7. Possibly, a register message is sent (111) to the proxy server 9 in order to allow use of IP services (such as HTTP, FTP, SMTP, and so on) to the remote user. In such way, the service provider, furnishing the connection service to the user, authenticates the user.

On the other hand, if the matching among the signed responses is not verified, a reject request is sent (112) to the software client from the I-VLR 6. A stop accounting message may be also sent (113) to the NAS 3 from the I-VLR 6, in order to instruct the NAS 3 to interrupt communications with the personal computer 1.

The above disclosed authentication procedure of a remote user's terminal for access to a network service thus allows a mutual authentication between the remote user and the network service. Advantageously, such mutual authentication improves security for all connections, including connections implying portions using radio connection paths, such W-LAN connections. Such mutual authentication allows the service provider to recognize the remote user, and also allows the remote user to recognize the service provider, so that confidential information from the remote user cannot be captured by a hacker setting up a fake service provided through a fake access point. Furthermore, as explained above, the authentication procedure may be advantageously set up so as to use the same protocol for different connection types, and even for managing connection requests coming from access points belonging to different service providers.

It has to be understood that actual operations identified in the above described procedure may be implemented in suitable software code portions of computer programs, and carried out by any well-known general purpose computer having appropriate processing abilities, as it will appear to those skilled in the art. In particular, the description of the processing steps enables those skilled in the art to realize computer program codes appropriate to particular contexts and facilities, such as particular machines, computer languages, operating systems and the like.

Software programs realized according to the teachings of the present invention can be for example embodied in one or more executable files resident on suitable support accessible from the memory of the computer, such as a hard disk, a diskette, a CD- or DVD-ROM, or an external disk readable through a LAN. For the purposes of the present invention, the terms "software (or computer) program adapted to be loaded into the memory of a computer" also comprise files needed for the execution of the executable file or files, such as libraries, initialization files and so on, that can be resident on a suitable support accessible from the memory of the computer, such as a hard disk, a diskette, a CD-ROM or an external disk readable through a LAN. Furthermore, for the purposes of the present invention the terms "software program" also comprise files possibly different from the executable file or files and/or from the files needed for the execution of the same, embodied in an installable software, adapted, when run on the computer, to install the executable file or files and the files needed for the execution of the same. Such installable software can be resident on a suitable support, such as a diskette, or a CD-ROM or it can be available for download from a network resource, such as a server comprised in a LAN or reachable through an external network, for example the Internet.

The invention claimed is:

1. A method for a mutual authentication between a user and a communications network, said user being provided with a terminal to which a subscriber identity module is operatively coupled, said subscriber identity module storing at least one identifier and a first copy of a unique key associated to said user, said network including an authentication sub-system comprising at least a first authentication apparatus storing a second copy of said unique key associated to said user identifier, comprising:

sending said user identifier from said subscriber identity module to said terminal;

generating, a first number at said terminal;

sending said identifier and at least a portion of said first number from said terminal to said authentication sub-system through an access point of said network;

at said authentication sub-system, identifying said second copy of said unique key using said identifier, generating at least a second number and challenging said second number with said second copy of said unique key, so as to generate at least a first session key and at least a first signed response;

at said authentication sub-system, forming, according to a first rule, a second session key using at least said first session key, and encrypting at least said first number portion using said second session key;

sending at least said encrypted first number portion and said second number from said authentication sub-system to said terminal;

forwarding said second number from said terminal to said subscriber identity module and challenging, at said subscriber identity module said second number with said first copy of said unique key, so as to generate at least a third session key and at least a second signed response;

sending said third session key and said second signed response from said subscriber identity module to said terminal;

at said terminal, forming a fourth session key, according to a second rule corresponding to said first rule, using at least said third session key, and decrypting said first number portion received from said authentication sub-system using said fourth session key;

checking, at said terminal, a matching between said decrypted first number portion with a corresponding portion of said generated first number, so as to allow communications from said network to said terminal;

sending at least said second signed response from said terminal to said authentication sub-system; and at said authentication sub-system, checking a matching between said first signed response and said second signed response, so as to allow communications from said terminal to said network.

2. The method according to claim 1, further comprising encrypting said identifier and said first number portion at said terminal before the step of sending from said terminal to said authentication sub-system, said encryption being performed with a predetermined public key, stored on said terminal.

3. The method according to claim 2, further comprising decrypting said identifier and said first number portion at said authentication sub-system, said decryption being performed with a private key related to said predetermined public key.

4. The method according to claim 1, wherein said first rule for forming said second session key comprises concatenating said first session key and said first signed response.

5. The method according to claim 4, wherein said second rule for forming said fourth session key comprises concatenating said third session key and said second signed response.

6. The method according to claim 1, wherein said step of encrypting, at said authentication sub-system at least said first number portion using said second session key comprises encrypting also a transaction identifier generated at said authentication sub-system.

7. The method according to claim 6, wherein said step of decrypting, at said terminal said first number portion received from said authentication sub-system using said fourth session key also comprises decrypting said transaction identifier.

8. The method according to claim 7, further comprising sending said decrypted transaction identifier from said terminal to said authentication sub-system.

9. The method according to claim 1 further comprising generating, at said authentication sub-system, at least a third number and challenging said third number with said second copy of said unique key, so as to generate at least a fifth session key and at least a third signed response.

10. The method according to claim 9, wherein said first rule for forming said second session key comprises concatenating at least one among said first session key and said first signed response with at least one among said fifth session key and said third signed response.

11. The method according to claim 9, wherein said step of sending at least said encrypted first number portion and said second number from said authentication sub-system to said terminal further comprises sending said third number to said terminal.

12. The method according to claim 11, further comprising challenging, at said subscriber identity module, said third number with said first copy of said unique key, so as to generate at least a sixth session key and at least a fourth signed response.

13. The method according to claim 12, wherein said second rule for forming said fourth session key comprises concatenating at least one among said third session key and said second signed response with at least one among said sixth session key and said fourth signed response.

14. A method for allowing a user to verify a trust of a communications network, the user being provided with a terminal to which a subscriber identity module is operatively coupled, said subscriber identity module storing at least one identifier and at least one unique key associated to said user, said network including an authentication sub-system, said method comprising, at said terminal:

receiving said user identifier from said subscriber identity module;

generating a first number sending said identifier and at least a portion of said first number to said authentication sub-system through an access point of said network;

receiving from said authentication sub-system through said access point, an encrypted number and at least a second number generated at said authentication sub-system;

forwarding said second number to said subscriber identity module;

receiving, from said subscriber identity module at least a first session key and a first signed response, obtained at said subscriber identity module from a challenge on said second number with said unique key;

generating a second session key using at least one among said first session key and said first signed response, according to a predetermined rule;

decrypting said encrypted number received from said authentication sub-system using said second session key; and checking a matching between said portion of said first number with a corresponding first portion of said decrypted number, so as to allow trust verification of said network.

15. The method according to claim 14, further comprising encrypting said identifier and said first number portion at said terminal before said step of sending from said terminal to said authentication sub-system, said encryption being performed with a predetermined public key stored on said terminal.

16. The method according to claim 15, wherein said predetermined rule for forming said second session key comprises concatenating said first session key and said first signed response.

17. The method according to claim 14, further comprising sending said first signed response to said authentication sub-system.

18. The method according to claim 17, further comprising sending a second portion of said decrypted number to said authentication sub-system.

19. The method according to claim 14 further comprising receiving, from said authentication sub-system, at least a third number generated at said authentication sub-system.

20. The method according to claim 19, further comprising forwarding said third number to said subscriber identity module.

21. The method according to claim 20, further comprising receiving, from said subscriber identity module at least a third session key and a second signed response, obtained at said subscriber identity module from a challenge on said third number with said unique key.

22. The method according to claim 21, wherein said predetermined rule for forming said second session key comprises concatenating at least one among said first session key and said first signed response with at least one among said third session key and said second signed response.

23. A computer-readable medium storing instructions for executing a software program loadable into a memory of a computer, said software program comprising software code portions for performing a method for allowing a user to verify a trust of a communications network, the user being provided with a terminal to which a subscriber identity module is operatively coupled, said subscriber identity module storing at least one identifier and at least one unique key associated to said user, said network including an authentication sub-system, said method comprising:
- receiving said user identifier from said subscriber identity module;
- generating a first number;
- sending said identifier and at least a portion of said first number to said authentication sub-system through an access point of said network;
- receiving from said authentication sub-system through said access point, an encrypted number and at least a second number generated at said authentication sub-system;
- forwarding said second number to said subscriber identity module;
- receiving, from said subscriber identity module at least a first session key and a first signed response, obtained at said subscriber identity module from a challenge on said second number with said unique key;
- generating a second session key using at least one among said first session key and said first signed response, according to a predetermined rule;
- decrypting said encrypted number received from said authentication sub-system using said second session key; and
- checking a matching between said portion of said first number with a corresponding first portion of said decrypted number, so as to allow trust verification of said network.

24. The computer-readable medium according to claim 23, wherein the software program is made accessible from a memory of a user's terminal.

25. The computer-readable medium according to claim 23, wherein the software program is included in an authentication kit for authenticating a user's terminal in a communications network.

26. The computer-readable medium according to claim 25, wherein said authentication kit further comprises a subscriber identity module of a type adopted in mobile communication networks for authenticating mobile communication terminals.

27. A method for allowing a user to verify a trust of a communications network, the user being provided with a terminal, with an identifier and with a shared secret, said network including an authentication sub-system storing said user's identifier associated to a copy of said shared secret, said method comprising, under control of said terminal:
- generating a first number;
- sending said user's identifier and at least a portion of said first number to said authentication sub-system through an access point of said network;
- receiving from said authentication sub-system through said access point, an encrypted number, said encrypted number being encrypted with a session key generated at said authentication sub-system based on said copy of said shared secret and on a second number generated at said authentication sub-system;
- receiving said second number from said authentication sub-system through said access point;
- processing said second number and said shared secret so as to obtain a copy of said session key;
- decrypting said encrypted number received from said authentication sub-system using said copy of said session key; and
- checking a matching between said portion of said first number with a corresponding portion of said decrypted number, so as to allow trust verification of said network.

* * * * *